United States Patent
Jia et al.

(10) Patent No.: US 8,521,199 B2
(45) Date of Patent: Aug. 27, 2013

(54) SYSTEM AND METHOD FOR TRANSPARENT COORDINATED BEAM-FORMING

(75) Inventors: Ming Jia, Ottawa (CA); Jianglei Ma, Ottawa (CA)

(73) Assignee: Futurewei Technologies, Inc., Plano, TX (US)

(*) Notice: Subject to any disclaimer, the term of this patent is extended or adjusted under 35 U.S.C. 154(b) by 529 days.

(21) Appl. No.: 12/816,178

(22) Filed: Jun. 15, 2010

(65) Prior Publication Data

US 2011/0306381 A1 Dec. 15, 2011

(51) Int. Cl.
*H04B 15/00* (2006.01)

(52) U.S. Cl.
USPC .......................................................... 455/501

(58) Field of Classification Search
USPC ............... 455/501, 63.1, 69, 114.2, 419, 420, 455/422.1, 504, 509, 522, 524, 561; 375/150, 375/146, 147, 220; 370/310, 318, 328
See application file for complete search history.

(56) References Cited

U.S. PATENT DOCUMENTS

| | | | |
|---|---|---|---|
| 6,748,222 B1 | 6/2004 | Hashem et al. | |
| 2005/0245237 A1* | 11/2005 | Adachi et al. | 455/411 |
| 2009/0170437 A1 | 7/2009 | Bhattad et al. | |
| 2010/0173660 A1* | 7/2010 | Liu et al. | 455/501 |

FOREIGN PATENT DOCUMENTS

| | | |
|---|---|---|
| CN | 101494481 A | 7/2009 |
| CN | 101686486 A | 3/2010 |
| KR | 2005-0068430 A | 7/2005 |

OTHER PUBLICATIONS

Catt, Ritt, "UL SU-MIMO Antenna Calibration at UE," R1-090944, 3GPP TSG RAN WG1 #56, Feb. 9-13, 2009, 5 pages, Athens, Greece.

Ericsson, "Channel reciprocity in FDD Systems including systems with large duplex distance," R1-100853, TSG-RAN WG1 #60, Feb. 22-26, 2010, 5 pages, San Francisco, CA.

International Search Report and Written Opinion received in Patent Cooperation Treaty Application No. PCT/CN2011/074654, mailed Aug. 25, 2011, 10 pages.

* cited by examiner

*Primary Examiner* — Shaima Q Aminzay
(74) *Attorney, Agent, or Firm* — Slater & Matsil, L.L.P.

(57) ABSTRACT

A system and method for transparent coordinated beam-forming are provided. A method for transmitting information includes determining correlations between communications devices served by a communications controller and communications devices served by neighboring communications controllers, selecting a communications device from the communications devices served by the communications controller, adjusting a manner of transmission of a transmission containing information to the selected communications device based on a correlation for the selected communications device, and transmitting the transmission to the selected communications device.

21 Claims, 5 Drawing Sheets

SYSTEM AND METHOD FOR TRANSPARENT COORDINATED BEAM-FORMING

TECHNICAL FIELD

The present invention relates generally to a system and method for wireless communications, and more particularly to a system and method for transparent coordinated beam-forming.

BACKGROUND

Generally, coordinated beam-forming (CBF), also referred to as Coordinated Scheduling/Beamforming, is an effective yet cost efficient way to improve cell-edge throughput. Its main objective is to eliminate the flashlight effect in the interference caused by closed-loop multiple input, multiple output (CL-MIMO) operation, so as to restore the effectiveness in link adaptation. Another objective, although to less extent, is to reduce inter-cell interference (ICI), so as to improve the average throughput promised by user equipment (UE) measured signal to interference plus noise ratio (SINR).

Since in frequency division duplexed (FDD) communications systems, the transmitter does not know the channel in the downlink (DL), limited channel state information (CSI) needs to be sent back by the UE to the transmitter. However, it has been agreed in the Third Generation Partnership Project (3GPP) Technical Specifications Group Radio Access Network Working Group One (TSG-RAN WG1) #60 meeting that no additional features are to be specified in Release-10 of 3GPP Long Term Evolution (LTE) technical standards to support DL coordinated multipoint (CoMP) transmission, which makes DL CoMP related UE feedback unavailable. To make CBF work, channel reciprocity between the uplink (UL) and the DL may be used.

SUMMARY OF THE INVENTION

These and other problems are generally solved or circumvented, and technical advantages are generally achieved, by preferred embodiments of the present invention which provide a system and method for transparent coordinated beam-forming.

In accordance with a preferred embodiment of the present invention, a method for transmitting information is provided. The method includes determining correlations between communications devices served by a communications controller and communications devices served by neighboring communications controllers, selecting a communications device from the communications devices served by the communications controller based on the correlations, adjusting a manner of transmission of a transmission containing information to the selected communications device based on a correlation for the selected communications device, and transmitting the transmission to the selected communications device.

In accordance with another preferred embodiment of the present invention, a method for transmitting information by a cooperating communications controller is provided. The method includes sharing communications device information with neighboring communications controllers, determining an orthogonality value for each communications device served by the cooperating communications controller with respect to communications devices served by the neighboring communications controllers, selecting a communications device based on the communications device orthogonality values, adjusting a manner of transmission of a transmission to the selected communications device based on the orthogonality value of the selected communications device, and transmitting the transmission to the selected communications device.

In accordance with another preferred embodiment of the present invention, a communications controller is provided. The communications controller includes a receiver to be coupled to a receive antenna, a transmitter coupled to a transmit antenna, a memory, a processor coupled to the receiver, to the transmitter, and to the memory, and a scheduler coupled to the processor. The receiver receives signals detected by the receive antenna, the transmitter transmits signals with the transmit antenna, and the memory stores information shared with other communications controllers, channel measurements, and orthogonality values. The processor determines correlations between communications devices served by the communications controller and communications devices served by neighboring communications controllers, and adjusts a transmit power level of a transmission to the selected communications device or a beam used to transmit the transmission to the selected communications device based on a correlation value for the selected communications device, and the scheduler selects a communications device from the communications devices served by the communications controller.

An advantage of an embodiment is that coordinated beam-forming may be implemented without requiring eNB radio frequency (RF) calibration, which may be difficult to implement due to issues such as high cost and high disparity between transmit power for actual transmissions and self-calibration.

A further advantage of an embodiment is that a reduction in feedback from UEs served by the eNBs is achieved, which may help to reduce communications system overhead and improve overall communications system performance.

Yet another advantage of an embodiment is that coordinated beam-forming may be used in both FDD and time division duplexed (TDD) communications systems. Furthermore, when applied to FDD communications systems, eNB RF calibration is not needed.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3b is a diagram of a detailed view of a processor shown in FIG. 3a;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution (LTE) Release-10 compliant communications system without specific support for coordinated beam-forming. The invention may also be applied, however, to other communications systems, such as WiMAX, as well as other technical standards without specific support for coordinated beam-forming.

Figure 1:
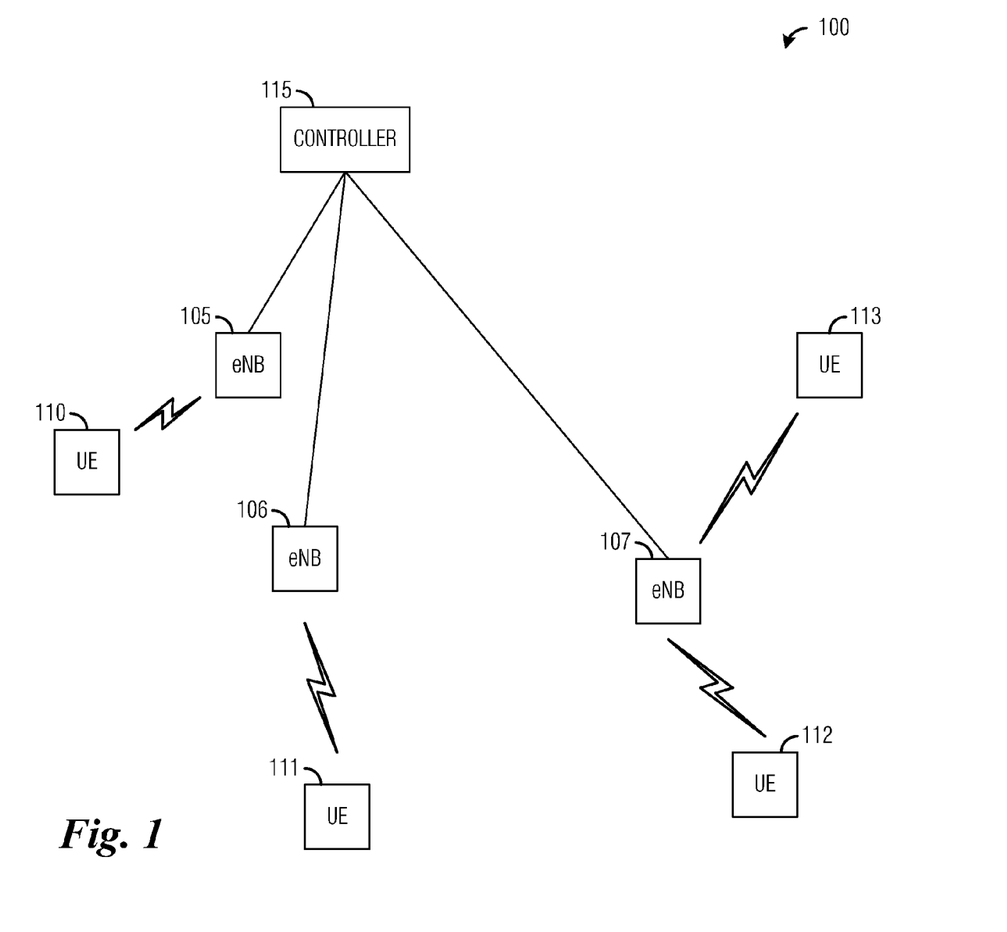
FIG. 1 is a diagram of a communications system.

FIG. 1 illustrates a communications system 100. Communications system 100 includes a number of enhanced NodeBs (eNB), such as eNB 105, eNB 106, and eNB 107. Each of the eNBs may be responsible for allocating network resources to UEs, such as UE 110, UE 111, UE 112, and UE 113, that it is serving. For example, an eNB may forward a transmission intended for a UE that it is serving or allocate some network resources to a UE that it is serving so that the UE may transmit information.

Some or all of the eNBs in communications system 100 may be operating in a coordinate beam-forming mode. The eNBs that are operating in a coordinated beam-forming mode may be referred to as being in an in-use subset of all eNBs since not all eNBs are required to participate in coordinated beam-forming mode. The eNBs that are operating in the coordinated beam-forming mode may coordinate between one another to select UEs for servicing that may help to minimize ICI.

According to an embodiment the UEs selected for servicing by an eNB may be selected based on their orthogonality to UEs serviced by other eNBs participating in coordinated beam-forming mode. The orthogonality of the UEs may be determined based on measurements of channels between the UEs and their respective serving eNBs as well as channels between the UEs and non-served UEs specified by neighboring eNBs. As an example, measurements of UL channels between UEs and eNBs may be used to compute an orthogonality between the UEs and the orthogonality may be used to select the UEs for servicing as well as potentially setting a transmit power to minimize ICI if needed.

According to an embodiment, if any two UEs serviced by different eNBs are orthogonal to one another or exceed a specified orthogonality threshold or exceed a correlation (computed based on the measured channels) threshold, then a standard or default transmit power may be used. However, if the UEs are not orthogonal, do not exceed a specified orthogonality threshold, or have a correlation that is greater than a specified correlation threshold, then the transmit power may be adjusted to reduce ICI.

As an example, transmissions between eNB 105 and UE 110 may receive interference from transmissions between eNB 106 and UE 111. However, if the transmissions are orthogonal or near orthogonal (i.e., the transmissions have small correlation), then ICI may be small and therefore, the transmit power may not need adjustment. However, if the transmissions are not orthogonal, i.e., the transmissions have high correlation, then ICI may be large unless the transmit power is adjusted.

Considerable effort has been applied to exploit channel reciprocity in TDD communications systems. Channel reciprocity typically involves RF chain calibration at an eNB, which may be performed using cross air signaling between the eNB and UEs, thereby requiring support in the technical standards. Recently, self calibration was discussed in LTE-Advanced, however, concerns remain because transmit power levels used for self calibration may be very different from that of transmit power levels used for normal signal transmission. The different transmit power levels raises questions about power amplifier linearity. Furthermore, when applied to eNB self calibration, the difference in transmit power levels are even greater. Additionally, in FDD communications systems, channel reciprocity becomes questionable due to different carrier frequencies used in the UL and DL channels.

Figure 2A:
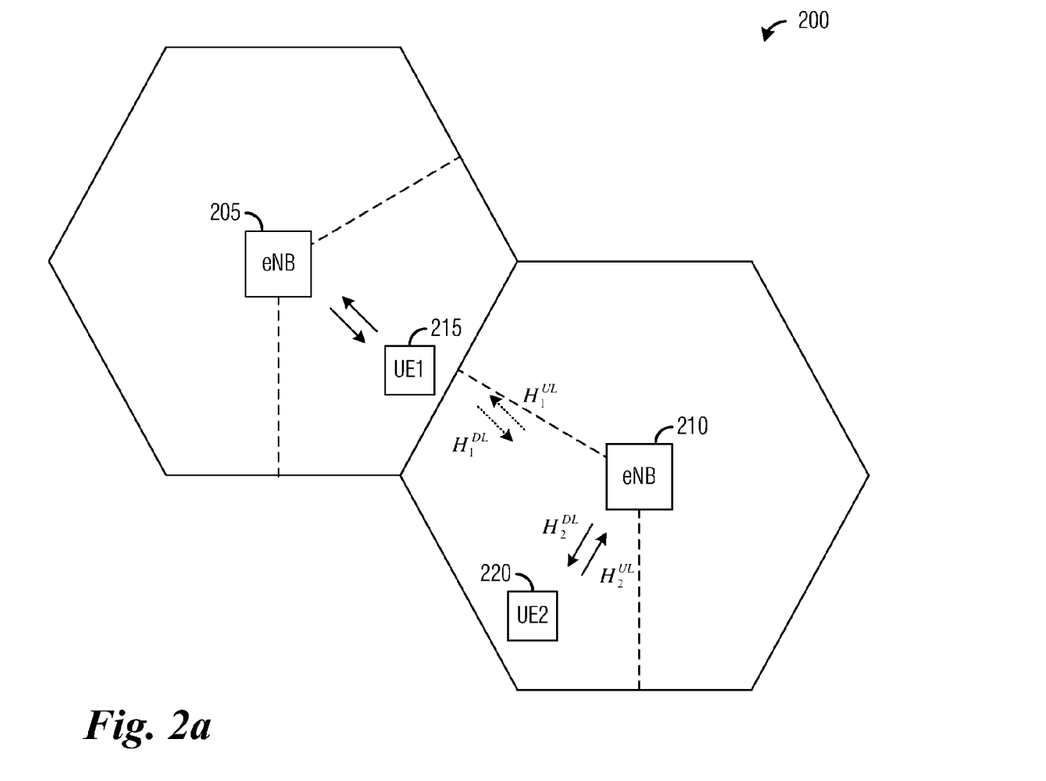
FIG. 2a is a diagram of a portion of a communications system.

FIG. 2a illustrates a portion of a communications system 200. Communications system 200 includes a first eNB 205 and a second eNB 210. First eNB 205 and second eNB 210 are adjacent to one another. First eNB 205 is serving a first UE "UE1" 215 and second eNB 210 is serving a second UE "UE2" 220. UE1 215 and UE2 220 may be operating in adjacent sectors in a coverage area of their respective serving eNBs and may be relatively close to each other.

First eNB 205 may transmit to UE1 215 over a DL channel and UE1 215 may transmit to first eNB 205 over an UL channel. Similarly, second eNB 210 may transmit to UE2 220 over a DL channel denoted as $H_2^{DL}$ and UE2 220 may transmit to second eNB 210 over an UL channel denoted as $H_2^{UL}$.

Since UE1 215 is relatively close to second eNB 210, transmission to and from UE2 220 may cause interference to transmissions to and from UE1 215. Transmissions to and from UE2 220 appearing as interference to transmissions to and from UE1 215 may be denoted as $H_1^{DL}$ for DL transmissions from first eNB 205 to UE1 215 and $H_1^{UL}$ for UL transmissions from UE1 215 to first eNB 205. Since UE2 220 may be far away from first eNB 205, interference from first eNB 205 to UE2 220 may be small.

Figure 2B:
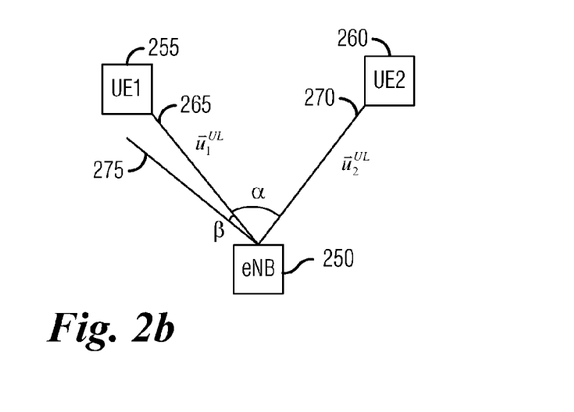
FIG. 2b is a diagram of notation used in discussion of the embodiments

FIG. 2b illustrates notation used in discussion of the embodiments. Illustrated in FIG. 2b are channels and angles of transmission between a cooperating eNB 250 and two UEs, a UE1 255 and a UE2 260. Line 265 represents a transmission corresponding to an UL channel from UE1 255 to cooperating eNB 250 appearing as interference to UE2 260 and line 270 represents a transmission corresponding to an UL channel from UE2 260 to its serving eNB. Line 275 represents a line for an orthogonal transmission to line 270. If UE1 255 is orthogonal to UE2 260, then line 265 and line 275 would be identical. Line 265 may be referred to as and line 270 may be referred to as $\bar{u}_2^{UL}$.

An angle α represents an angle between line 265 and line 270. If UE1 255 is orthogonal to UE2 260, then angle α would be 90. An angle β represents an angle between line 265 and line 275. If UE1 255 is orthogonal to UE2 260, then angle β would be 0.

Generally, when channel reciprocity is used, it is typically used in reference to a relationship between $H_1^{UL}$ and $H_1^{DL}$. In a TDD communications system, to derive $H_1^{DL}$ from $H_1^{UL}$, RF calibration may be needed.

In coordinated beam-forming mode, the orthogonality between UEs, such as UE1 255 and UE2 260 may be a point of concern. Usually, when UE2 260 to UE1 255 are not orthogonal, it may be beneficial to take a receiver direction of UE1 255 into account. When UE1 255 is unable to feed back its receiver direction, the orthogonality may be based solely on beam directions at a transmitter side.

Considering transmit and receive RF chains into consideration, the UL channels of UE1 255 and UE2 260 may be expressed as $$\tilde{H}_1^{UL} = K_{eNB,Rx} H_1^{UL} K_{1,Tx}$$

$$\tilde{H}_2^{UL} = K_{eNB,Rx} H_2^{UL} K_{2,Tx} \quad (1)$$

where $K_{eNB,Rx}$, $K_{1,Tx}$, and $K_{2,Tx}$ are diagonal matrices with complex gains of the transmit and receive chains.

Using singular value decomposition (SVD) on $\tilde{H}_1^{UL}$ and $\tilde{H}_2^{UL}$, the following may be obtained $$\tilde{H}_1^{UL} = K_{eNB,Rx} U_1^{UL} D_1^{UL} (\tilde{V}_1^{UL})^H$$

$$\tilde{H}_2^{UL} = K_{eNB,Rx} U_2^{UL} D_2^{UL} (\tilde{V}_2^{UL})^H \quad (2)$$

where $T_{UL \to DL}$ is a unitary diagonal complex transforming matrix for carrier frequency compensation, and $K_{eNB,Tx}$ is diagonal matrix with complex gains of the transmit chain. If $K_{eNB,Tx}$ is assumed to have constant modulus, which is usually the case for eNB, then the DL right singular matrices may be expressed as (with $(A)^T$ denoting the transpose of A)

$$\tilde{V}_1^{DL} = (T_{UL \to DL} K_{eNB,Tx} K_{eNB,Rx} U_1^{UL})^T$$

$$\tilde{V}_2^{DL} = (T_{UL \to DL} K_{eNB,Tx} K_{eNB,Rx} U_2^{UL})^T \quad (3)$$

which is also unitary.

Assume that $\bar{u}_1^{UL}$ and $\bar{u}_2^{UL}$ are the two principal singular vectors for $U_1^{UL}$ and $U_2^{UL}$, respectively, and $$\tilde{f}_2^{DL} = (T_{UL \to DL} K_{eNB,Tx} K_{eNB,Rx} \bar{u}_2^{UL})^* \quad (4)$$

is the beam direction reported by UE2 260, then from Equation (4), if $\bar{u}_1^{UL} \perp \bar{u}_2^{UL}$, then $\tilde{f}_1^{DL} \perp \tilde{f}_2^{DL}$, where $$\tilde{f}_1^{DL} = (T_{UL \to DL} K_{eNB,Tx} K_{eNB,Rx} \bar{u}_1^{UL})^* \quad (5)$$

is the principal eigen-direction for UE1 255.

The above discussed derivation show that if the two principal singular vectors ($\bar{u}_1^{UL}$ and $\bar{u}_2^{UL}$) for $U_1^{UL}$ and $U_2^{UL}$ are orthogonal in the UL, then the beam directions reported by UE1 255 and UE2 260 ($\tilde{f}_1^{DL}$ and $\tilde{f}_2^{DL}$) are also orthogonal in the DL.

In the context of coordinated beam-forming mode, an eNB receives beam direction feedback $\tilde{f}_2^{DL}$ from its own served UE (e.g., UE2 260) but does not receive feedback from UEs served by other eNBs. Therefore, the eNB does not know if transmitting if the direction of $\tilde{f}_2^{DL}$ will incur interference from a UE (e.g., UE1 255) served by other eNBs in its principal eigen-direction. With the result shown above, collisions of transmissions from two UEs (e.g., UE1 255 and UE2 260) may be prevented using UL measurements, which may be readily measured by the eNB.

According to an embodiment, there may be no need to determine the actual DL channels and no eNB RF calibration is needed.

Figure 3A:
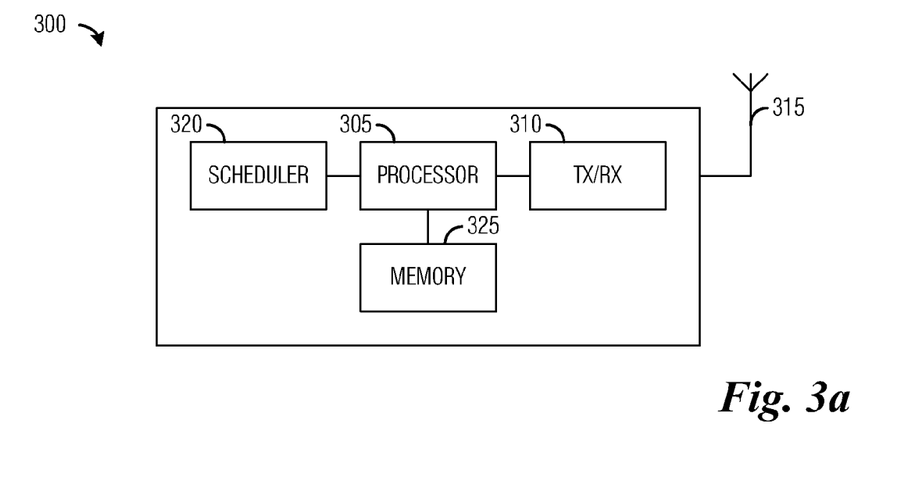
FIG. 3a is a diagram of an eNB.

FIG. 3a illustrates an eNB 300. eNB 300 may control communications to and from UEs that it is serving. eNB 300 may operate in several operating modes, including coordinated beam-forming mode. While operating in coordinated beam-forming mode, eNB 300 may coordinate with other eNBs also operating in coordinated beam-forming mode to reduce ICI to the other eNBs by adjusting transmit power to UEs that are not orthogonal or nearly orthogonal to UEs served by the other eNBs. If there are a sufficient number of UEs, eNB 300 may select UEs that are orthogonal (or nearly orthogonal) to UEs served by the other eNBs to receive transmissions or to transmit and force the non-orthogonal UEs to wait until they become orthogonal (or nearly orthogonal) as a result of their own mobility, the UEs served by the other eNBs change, or the mobility of the UEs served by the other eNBs.

eNB 300 may include a processor 305 that may be used to run applications and programs. Furthermore, processor 305 may be used to perform channel measurements of channels between eNB 300 and UEs served by eNB 300 as well as potentially UEs served by other eNBs. As an example, referencing back to FIG. 1, eNB 105 may compute channels between itself and UE 110 along with channels with UE 111 and UE 112 and other detectable UEs.

Processor 305 may also be used to coordinate with other eNBs when eNB 300 is operating in coordinated beam-forming mode. During coordination, eNB 300 and the other eNBs may share information regarding the UEs that they each serve, including identification information about the UEs, specific UEs that they wish to reduce ICI in order to improve the performance of the UE, location information for the UEs to assist other eNBs operating in coordinated beam-forming mode, and so forth.

Processor 305 may also be used to compute correlation values for UEs served by eNB 300 and UEs served by the other eNBs. The correlation values may be indicative of a relationship between two or more UEs and may be an indicator regarding the orthogonality between two or more UEs. The correlation value may be a measure of the impact of a transmission to or by a first UE to a transmission to or by a second UE and may be related to the orthogonality between the UEs. For example, if there is no correlation between two UEs, then the UEs may be orthogonal to one another or they may be so far apart that their transmissions do not interact. While if there is a high correlation between two UEs, then a transmission made by or to the first UE may have a large impact on transmissions to or by the second UE.

Processor 305 may also be used to adjust the transmit power of transmissions to UEs served by eNB 300 based on the computed correlation values. As discussed previously, the computed correlation values may be related to the orthogonality of the two UEs. Therefore, when there is a high correlation value between the two UEs, there may not be significant orthogonality between the two UEs and transmissions made to or from the first UE may an impact on the interference experienced by the second UE. When there is a high correlation between the two UEs, processor 305 may need to reduce a transmit power of transmissions made to or by the first UE to reduce interference to the second UE. When there is a low correlation between the two UEs, processor 305 may leave the transmit power of transmissions made to or by the first UE unchanged.

Processor 305 may also be used to select a beam to be used to transmit to UEs. The selection of the beams may also be based on the computed correlation values. A beam that may be finely focused and directed in the direction of a UE may cause less interference to communications in neighboring cells.

eNB 300 may also include a transmitter/receiver (TX/RX) 310 coupled to processor 305 that may be used to process information/data to be transmitted as well as process received information/data. For example, in addition to receiving and transmitting information/data, TX/RX 310 may filter, amplify, error detect, error correct, encode, decode, and so forth, the information/data. The information/data may be received or transmitted by way of an antenna 315. Although shown as a single antenna, antenna 315 may be an antenna array of multiple antennas. TX/RX 310 may also be used in measuring channels by processor 305.

eNB 300 may also include a scheduler 320 coupled to processor 305, which may be used to schedule transmission opportunities for UEs served by eNB 300 as well as schedule transmissions to UEs served by eNB 300. Scheduler 320 may make use of information, such as orthogonality information, correlation values, and so forth to schedule transmissions or transmission opportunities for UEs served by eNB 300. As an example, scheduler 320 may make use of a scheduling function with multiple inputs, such as orthogonality information, correlation values, coordination information received from the other eNBs, and so forth, to select UEs. Scheduler 320 may also select UEs based on information such as UE priority, data priority, UE service history, communications system traffic load, data buffer usage, data buffer status (full, empty, almost full, almost empty, fill rate, consumption rate, and so forth) in its selection of UEs.

eNB 300 may also include a memory 325 coupled to processor 305. Memory 325 may be used to store coordination information shared from other eNBs, channel measurements made by processor 305, orthogonality and/or correlation values derived from the channel measurements and/or coordination information, scheduling information provided by scheduler 320, information/data intended for UEs served by eNB 300, and so forth. Memory 325 may be implemented as read-only memories (ROMs), random access memories (RAMs), flash memories, erasable ROMs, or a combination thereof. For example, applications, which generally do not need to be changed and may need to be maintained while power is not being provided to eNB 300 may be stored in ROMs or erasable ROMs Similarly, information that may need to be regularly updated and may not need to be stored except when eNB 300 is operating may be stored in RAMs.

Figure 3B:
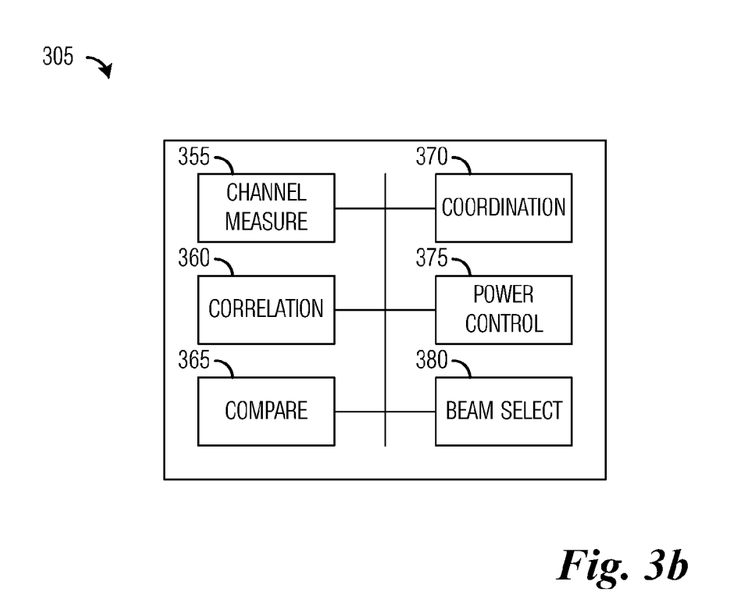

FIG. 3b illustrates a detailed view of processor 305. Processor 305 may be a processing unit, such as a general purpose microprocessor, a special purpose microprocessor, a micro controller, an application specific integrated circuit, a digital signal processor, and so forth, responsible for executing applications and programs, controlling operations of various components of eNB 300.

Processor 305 may include a channel measure unit 355 that may be used to measure channels between eNB 300 and UEs served by eNB 300 as well as other UEs detectable by eNB 300 but not served by eNB 300. Channel measure unit 355 may measure the channels by measuring transmissions made to and/or from the UEs over an extended period of time. Alternatively, if the transmissions to and/or from the UEs are accompanied by a unique reference sequence, the reference sequence may be used to measure the channels.

Processor 305 may also include a correlation unit 360 that may be used to compute a correlation value between two or more UEs. According to an embodiment, correlation unit 360 may make use of the channel measurements as provided by channel measurement unit 355 to compute the correlation values. As discussed previously, the correlation values may be an indication of the orthogonality between the UEs. A detailed discussion of the computation of the correlation values is provided below.

Processor 305 may also include a compare unit 365. Compare unit 365 may be used to compare the correlation value between two or more UEs with a threshold to determine if transmit power levels need to be adjusted. For example, if the correlation value exceeds the threshold, then the transmit power levels need to be adjusted, while if the correlation value does not exceed the threshold, the transmit power levels do not need to be adjusted. According to an embodiment, compare unit 365 may be implemented using a comparator of sufficient size (inputs).

Processor 305 may also include a coordination unit 370. Coordination unit 370 may be used to exchange information related to UEs served by eNB 300 with other eNBs also operating in coordinated beam-forming mode. Coordination unit 370 may transmit information related to UEs served by eNB 300 to the other eNBs and receive information related to the UEs served by the other eNBs. Coordination unit 370 may include a timer to determine when coordination is to take place, and so forth.

Processor 305 may also include a power control unit 375. Power control unit 375 may receive as input a desired transmit power level and may generate a power control word that may be provided to a power amplifier of TX/RX 310 so that a transmission may be suitably amplified. If the transmit power level is for a transmission to be made by a UE served by eNB 300, the power control word may be included in a transmission opportunity grant message to be transmitted to the UE. The UE upon receipt of the transmission opportunity grant message may set its transmit power level according to the power control word.

Processor 305 may also include a beam select unit 380. Beam select unit 380 may select a beam to be used to transmit to a UE and may make the beam selection based on the correlation value, as well as beam information, such as preferred beam information, provided by the UE. The preferred beam information may be an indication of the UE's preferred beam, which may have resulted in a highest SINR or some other channel quality measurement at the UE.

As discussed previously, a main objective of coordinated beam-forming mode is to avoid the flashlight effect so that link adaptation of CL-MEMO may work properly for cell-edge UEs (i.e., UEs operating at or near the edge of the coverage area of their serving eNB). In order to achieve the objective, it may be necessary to rely on UE pairings so that a serving eNB, such as second eNB 210, may schedule a first UE, such as UE2 220, with $\bar{u}_2^{UL}$ that is orthogonal (or approximately orthogonal) to $\bar{u}_1^{UL}$ of a second UE, such as UE1 215, so that it may be possible to achieve effective spatial multiplexing without causing the flashlight effect to the second UE. However, it may be unlikely to find $\bar{u}_2^{UL}$ that is exactly orthogonal to $\bar{u}_1^{UL}$ and although $\bar{u}_2^{UL}$ may not need to be exactly orthogonal to $\bar{u}_1^{UL}$, a certain degree of orthogonality may be needed to eliminate the flashlight effect.

For discussion purposes, assume that $N_T$ is the number of transmit antennas at an eNB, $\rho_f$ is the interference caused by the flashlight effect, and $\rho_m$ is the UE measured average interference based on which CQI report is calculated, then the relation between $\rho_f$ and $\rho_m$ is expressible as $$\rho_f = N_T \rho_m, \tag{6}$$

thereby providing a guideline for a cooperating eNB, e.g., first eNB 205, to eliminate the flashlight effect, for instance. Then $\bar{u}_2^{UL}$ needs to satisfy $$|(\bar{u}_1^{UL})^H \bar{u}_2^{UL}|^2 \le \frac{1}{N_T},$$

e.g. be $\pi/4$ away from $\bar{u}_1^{UL}$ for $N_T=2$ and $\pi/3$ away for $N_T=4$. Since the cooperating eNB knows its own $N_T$, it knows its beam operating region.

However, if the cooperating eNB cannot find a UE that it is serving that meets the orthogonality requirement, but if the cooperating eNB has a UE that is not far away from the orthogonality requirement, there may be two ways to make the UE pairing more flexible, namely beam adjustment and/or power adjustment.

A small amount of beam adjustment in the cooperating eNB may be very effective in reducing the flashlight effect since the cooperating eNB's scheduler knows the beam adjustment level and therefore, the post adjustment CQI. Additionally, the signal energy loss due to the beam adjustment may be small.

Figure 4:
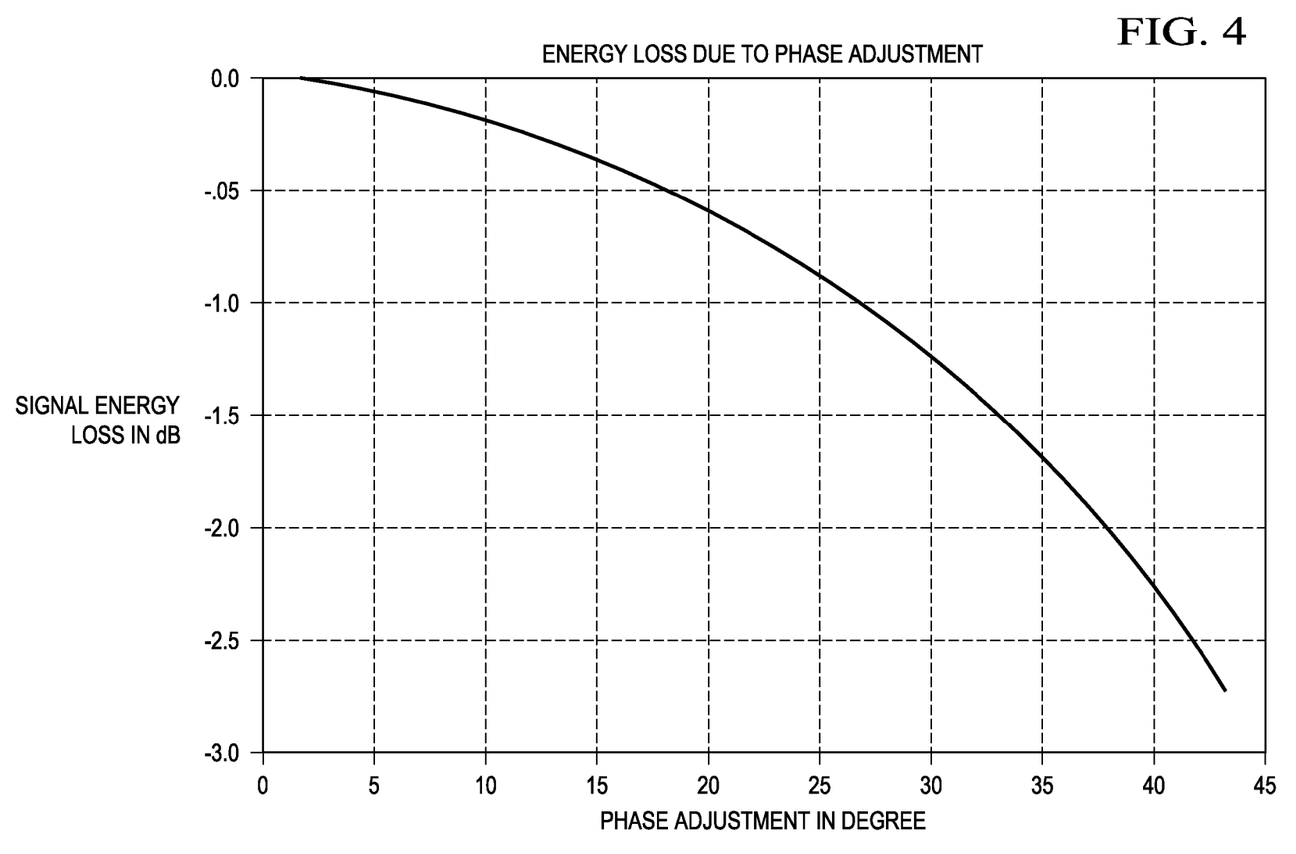
FIG. 4 is a plot of signal energy loss for different phase adjustment amounts.

FIG. 4 illustrates a plot of signal energy loss for different phase adjustment amounts. As an example, in FIG. 4, when the phase adjustment level is about 20 degrees, the signal energy loss is only about 0.5 dB.

Since $\bar{f}_1^{DL}$ may not be know, how is the adjusted beam direction $\bar{f}_{2,adj}^{DL}$ found? Again, the correlation between $\bar{u}_1^{UL}$ vs. $\bar{u}_2^{UL}$ and $\bar{f}_1^{DL}$ vs. $\bar{f}_2^{DL}$ may be used. Given $\bar{u}_1^{UL}$ and $\bar{u}_2^{UL}$, the direction that is orthogonal to $\bar{u}_1^{UL}$ but with maximum correlation to $\bar{u}_2^{UL}$ may be expressible as $$\bar{u}_{2,\perp}^{UL} = \frac{\bar{u}_2^{UL} - ((\bar{u}_1^{UL})^H \bar{u}_2^{UL}) \bar{u}_1^{UL}}{\|\bar{u}_2^{UL} - ((\bar{u}_1^{UL})^H \bar{u}_2^{UL}) \bar{u}_1^{UL}\|}. \tag{7}$$

Hence, the actual beam direction, with $\bar{u}_{2,adj}^{UL}$ being $(90°-\alpha)$ away from $\bar{u}_1^{UL}$ being expressible as $$\bar{u}_{2,adj}^{UL} = \cos(\alpha)\bar{u}_{2,\perp}^{UL} + \eta \sin(\alpha)\bar{u}_1^{UL}, \tag{8}$$

where $$\eta = \frac{(\bar{u}_1^{UL})^H \bar{u}_2^{UL}}{|(\bar{u}_1^{UL})^H \bar{u}_2^{UL}|}. \tag{9}$$

Since $\bar{u}_{2,adj}^{UL}$ is actually a rotation of $\bar{u}_2^{UL}$, $\bar{u}_2^{UL}$ can be related to $\bar{u}_2^{UL}$ through a unitary rotation matrix $\Phi_2$ expressible as $$\bar{u}_{2,adj}^{UL} = \Phi_2 \bar{u}_2^{UL}. \tag{10}$$

From Equations (4) and (5), it may be observed that if the following definition is made $$\bar{f}_{2,adj}^{DL} = \Phi_2 \bar{f}_2^{DL}, \tag{11}$$

then the relation en $\bar{f}_{2,adj}^{DL}$ and $\bar{f}_2^{DL}$ will be the same as that between $\bar{u}_{2,adj}^{UL}$ and $\bar{u}_2^{UL}$. An assumption that the UL channel and the DL channel are directly reciprocal is not made. Instead, an assumption regarding the relation between the UL beams and the DL beams are reciprocal is made, which is a more relaxed condition.

In practice, given $\bar{u}_{2,adj}^{UL}$ and $\bar{u}_2^{UL}$, finding $\Phi_2$ can be complex. An alternative way may be through transmit power adjustment, which is an extension of the concept from fractional frequency reuse (FFR), with a difference being the adjustment to the transmit power being used to eliminate the flashlight effect. Since $\bar{u}_2^{UL}$ is not far away from the orthogonality requirement, the transmit power adjustment may be small, which may help in avoiding unnecessarily triggering hybrid automatic repeat request (HARQ) transmissions for the coordinated beam-forming mode UE, and to improve link adaptation efficiency.

Transmit power adjustment may also give coordinated beam-forming mode a greater degree of flexibility in UE pairing since it may be possible to pair two colliding UEs. In an extreme example, it may be possible for a pair of full beam colliding UEs to transmit, but with transmit power adjustment, the flashlight effect may be more precisely controlled.

For discussion purposes, let $P_2$ be the transmit power for UE-2, $P_{2,adj}$ be the adjusted transmit power level if $\bar{u}_2^{UL}$ is less than $(90°-\alpha)$ away from $\bar{u}_1^{UL}$, and $\beta$ be the angle between $\bar{u}_2^{UL}$ and the required orthogonality, then the adjusted power level may be expressible as $$P_{2,adj} = \frac{\sin^2(\alpha)}{\sin^2(\alpha+\beta)} P_2. \tag{12}$$

In practice, $\alpha$ may be a prespecified (or semi-static) parameter, and hence $\sin^2(\alpha)$ is known in advance. In addition, $\sin^2(\alpha+\beta)$ may be easily calculated as $$\sin^2(\alpha+\beta) = |(\bar{u}_1^{UL})^H (\bar{u}_2^{UL})|^2. \tag{13}$$

Equation (12) may be used only when $$|(\bar{u}_1^{UL})^H (\bar{u}_2^{UL})|_2 > \sin^2(\alpha). \tag{14}$$

From the above discussion, transparent coordinated beam-forming mode may be formed in an easy and flexible way, i.e., by combining beam-based UE pairing and UE centric FFR. Most of the flashlight effect may be eliminated by the beam-based UE pairing, while the UE centric FFR may be used to remove residual flashlight effect and guarantee link adaptation functionality.

Furthermore, CQI adjustments for the cooperating eNB may be straightforward since the cooperating eNB has all of the information needed. Let $\gamma_2$ be the reported CQI, and $\gamma_{2,adj}$ be the adjusted CQI, then $\gamma_{2,adj}$ may be expressible as $$\gamma_{2,adj} = \frac{\sin^2(\alpha)}{|(\bar{u}_1^{UL})^H (\bar{u}_2^{UL})|^2} \gamma_2 \tag{15}$$

for transmit power adjustment, and $$\gamma_{2,adj} = |(\bar{u}_2^{UL})^H \bar{u}_{adj}^{UL}|^2 \gamma_2 \tag{16}$$

for beam adjustment.

CQI adjustment for the serving eNB, e.g, second eNB 210, may be more complex since it may be related to interference estimation, which the serving eNB may not have direct information. One technique that may be used to solve this problem is to use a resource reservation protocol (RSVP) report from the second UE. Since a RSVP report indicates long-term interference levels, it may be possible to adjust the CQI as follows $$\gamma_{1,adj} = \frac{\gamma_1}{I_{adj}}, \tag{17}$$

where $$I_{adj} = 1 - \frac{\chi_k(1 - N_T \sin^2(\alpha))}{\Sigma \chi_m}, \tag{18}$$

with $\chi_m$ being the RSRP report from the m-th neighboring cell, and $\chi_k$ being the RSVP report from the cooperating eNB (or eNBs).

Figure 5:
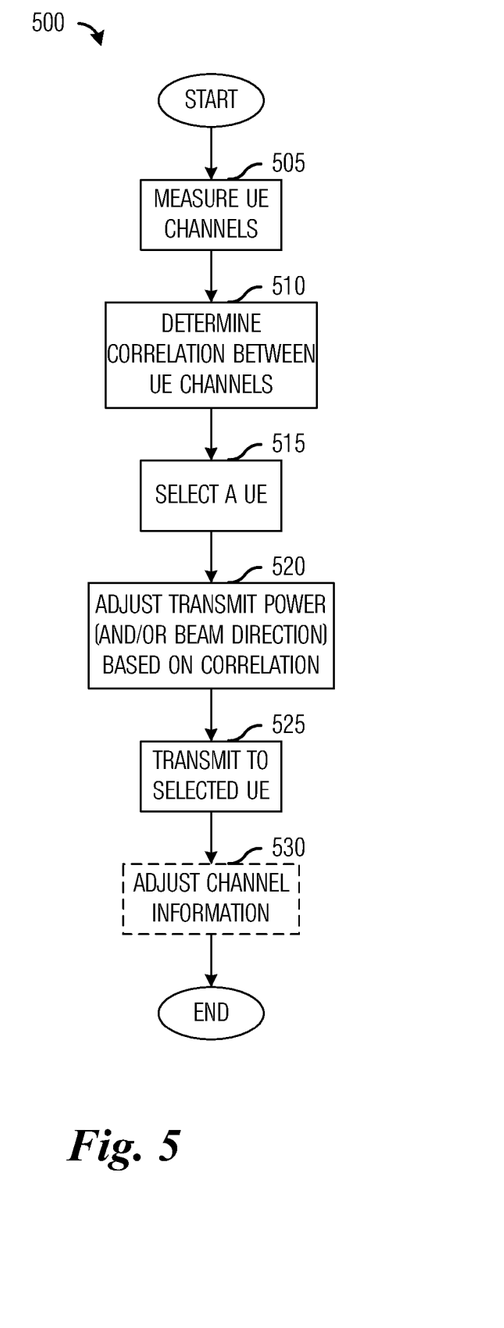
FIG. 5 is a flow diagram of eNB operations in the transmitting of information to a UE using coordinated beam-forming mode.

FIG. 5 illustrates a flow diagram of eNB operations 500 in the transmitting of information to a UE using coordinated beam-forming mode. eNB operations 500 may be indicative of operations occurring in a cooperating eNB as the cooperating eNB and a serving eNB operate in a coordinated beam-forming mode to help reduce or eliminate ICI to the serving eNBs and its UEs. eNB operations 500 may occur while the cooperating eNB is operating in a coordinated beam-forming mode with information to transmit to the UE.

eNB operations 500 may begin with the cooperating eNB measuring channels between itself and UEs (block 505). According to an embodiment, in addition to measuring channels between itself and UEs that it is serving, the cooperating eNB may also make channel measurements based on UL transmissions made by UEs denoted by adjacent serving eNBs that may need protection from ICI, such as cell edge UEs. According to an alternative embodiment, the cooperating eNB may make channel measurements between itself and all detectable UEs, including those that it is not serving. An example of channel measurements may be direction of incidence (DOI) measurements, and so forth.

The cooperating eNB may then compute correlation values between UE pairings consisting of UEs that it serving and UEs of neighboring eNBs (block 510). The correlation values may be an indication of the orthogonality of the UEs in each of the UE pairings. According to an embodiment, the cooperating eNB may compute correlation values for each of its own UEs paired with UEs of the neighboring eNBs specifically designated by the neighboring eNBs (the serving UEs) as potentially needing protection from ICI. According to an alternative embodiment, the cooperating eNB may compute correlation values for each of its own UEs paired with each UE of the neighboring eNBs that the cooperating eNB is capable of detecting.

According to an embodiment, the correlation values may be computed as $$|(\bar{u}_1^{UL})^H(\bar{u}_2^{UL})|,$$

where both $\bar{u}_1^{UL}$ and $\bar{u}_2^{UL}$ are directional vectors of unit length and may be measured by the cooperating eNB in block 505, for example. The correlation values may be in the range of (0, 1) with the larger the correlation value, the more correlated the two UEs are. In other words, the larger the correlation value, the less orthogonal the two UEs are.

The cooperating eNB may then select a UE for transmission (block 515). The cooperating eNB may also select a network resource over which the transmission to the selected UE may occur. According to an embodiment, the cooperating eNB may select a UE for transmission based on considerations such data being held in a buffer intended for the UE, the correlation value of the UE, priority of the UE, priority of the data being buffered for the UE, historical serving history for the UE, and so forth. As an example, the cooperating eNB may select a UE that has a lowest correlation value (most orthogonal) with data buffered in memory. Alternatively, the cooperating eNB may select a UE with a slightly higher correlation value but with higher priority data buffered in memory.

The cooperating eNB may then adjust the transmit power level for the selected UE based on the correlation value (block 520). According to an embodiment, the cooperating eNB may check the correlation value of the selected UE and if the correlation value exceeds a threshold, then the cooperating eNB may adjust the transmit power level. As an example, the transmit power level may be adjusted based on relative angles between the selected UE and a UE from a neighboring eNB, expressible as $$P_{2,adj} = \frac{\sin^2(\alpha)}{\sin^2(\alpha + \beta)} P_2,$$

where $\beta$ be an angle between $\bar{u}_2^{UL}$ and a required orthogonality, $\alpha$ may be a prespecified (or semi-static) parameter, and $P_2$ be an unadjusted transmit power level.

According to an embodiment, rather than adjusting the transmission power level, the cooperating eNB may adjust a beam direction used in the transmission. Based on the correlation value, the eNB may adjust a beam direction from a default beam to a preferred beam for the UE being scheduled, wherein the preferred beam for the UE may be reported by the UE itself, selected based on a known position of the UE, or so forth, for example. A beam may be selected to be used in the transmission to the UE that is more directed towards the UE so that ICI caused by the transmission to the UE may be reduced.

According to an embodiment, both adjusting the beam direction and the transmission power level may be adjusted based on the orthogonality. A beam that is more directed towards the UE may be selected to reduce a significant amount of ICI and the transmission power level may also be adjusted to further reduce the ICI.

If the correlation value does not exceed the threshold, then the transmit power level (and/or the beam direction) may not need to be adjusted and the cooperating eNB may transmit to the selected UE at a default transmit power level as well as potentially on a default beam. The cooperating eNB may then transmit to the selected UE at the selected network resource at the transmit power level and/or selected beam (block 525) and eNB operations 500 may then terminate.

eNB operations 500 may optionally include the cooperating eNB adjusting channel information received in reports from the UEs served by the cooperating eNB (block 530). According to an embodiment, the adjusting of the channel information may compensate for adjustments that may have been made in transmit power levels of transmissions (as well as beam selections) made by the cooperating eNB. According to an embodiment, the cooperating eNB may adjust the channel information based on RSVP reports received from the UEs, as shown in Equations (17) and (18).

Similarly, the serving eNB may also adjust the channel information received from its own UEs. According to an embodiment, the serving eNB may adjust the channel information as shown in Equations (15) and (16).

Figure 6:
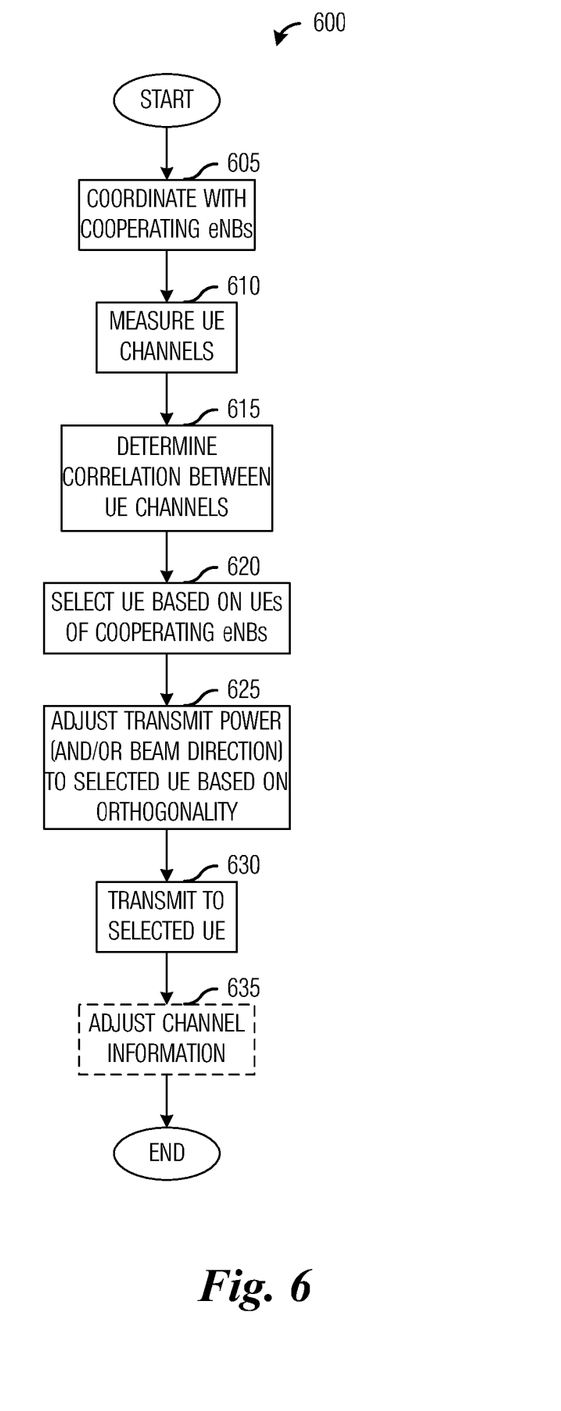
FIG. 6 is a flow diagram of eNB operations in the transmitting of information to a UE using coordinated beam-forming mode with coordination from cooperating eNBs.

FIG. 6 illustrates a flow diagram of eNB operations 600 in the transmitting of information to a UE using coordinated beam-forming mode with coordination from neighboring eNBs. eNB operations 600 may be indicative of operations occurring in a cooperating eNB as the cooperating eNB operates in a coordinated beam-forming mode to help reduce or eliminate ICI to neighboring eNBs and their UEs. The cooperating eNB may coordinate with neighboring eNBs to share information regarding served UEs. eNB operations 600 may occur while the cooperating eNB is operating in a coordinated beam-forming mode with information to transmit to the UE.

eNB operations 600 may begin with the cooperating eNB coordinating with the neighboring eNBs, also referred to as serving eNBs (block 605). According to an embodiment, the cooperating eNB and the neighboring eNBs may share information such as UE identity, specific UEs that each eNB wishes to protect from interference, and so forth.

The cooperating eNB may then measure channels between itself and UEs that it is serving as well as UEs that the neighboring eNBs wish to protect (block 610). According to an embodiment, the cooperating eNB may make channel measurements based on UL transmissions made by the UEs. An example of channel measurements may be DOI measurements, and so forth.

The cooperating eNB may then compute correlation values between UE pairs consisting of the UEs that it serving and UEs of neighboring eNBs (block 615). The correlation values may be an indicator of the orthogonality of the UE pairs (UEs served by the cooperating eNB and the UEs of the neighboring eNBs). According to an embodiment, the cooperating eNB may compute correlation values for each of the UE pairs consisting of its own UEs paired with UEs of the neighboring eNBs specifically designated by the neighboring eNBs. According to an alternative embodiment, the cooperating eNB may compute correlation values for each of the UE pairs consisting of its own UEs paired with each UE of the neighboring and serving eNBs that the cooperating eNB is capable of detecting.

The cooperating eNB may then select a UE for transmission (block 620). The cooperating eNB may also select a network resource over which the transmission to the selected UE may occur. According to an embodiment, the cooperating eNB may select a UE for transmission based on considerations such data being held in a buffer intended for the UE, the correlation value of the UE, priority of the UE, priority of the data being buffered for the UE, historical serving history for the UE, and so forth. As an example, the cooperating eNB may select a UE that has a lowest correlation value (most orthogonal) with data buffered in memory. Alternatively, the cooperating eNB may select a UE with a slightly higher correlation value but with higher priority data buffered in memory.

The cooperating eNB may then adjust the transmit power level (and/or a beam direction used for transmission) for the selected UE based on the correlation value (block 625). According to an embodiment, the cooperating eNB may check the correlation value of the selected UE and if the correlation value exceeds a threshold, then the cooperating eNB may adjust the transmit power level and/or the beam direction. If the correlation value does not exceed the threshold, then the transmit power level and/or the beam direction may not need to be adjusted and the cooperating eNB may transmit to the selected UE at a default transmit power level and/or default beam direction. The cooperating eNB may then transmit to the selected UE at the selected network resource at the transmit power level and beam direction (either adjusted or default) (block 630) and eNB operations 600 may then terminate.

eNB operations 600 may optionally include the cooperating eNB adjusting channel information received in reports from the UEs served by the cooperating eNB (block 635). According to an embodiment, the adjusting of the channel information may compensate for adjustments that may have been made in transmit power levels of transmissions made by the cooperating eNB. According to an embodiment, the cooperating eNB may adjust the channel information based on RSVP reports received from the UEs, as shown in Equations (17) and (18).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information, the method comprising:
    determining correlations between communications devices served by a communications controller and communications devices served by neighboring communications controllers;
    selecting a communications device from the communications devices served by the communications controller in accordance with the correlations;
    adjusting a manner of transmission of a transmission containing information to the selected communications device in accordance with at least one of the correlations for the selected communications device; and
    transmitting the transmission to the selected communications device,
    wherein determining the correlations comprises:
    measuring a channel between communications devices in each pair of communications devices consisting of one of each communications device served by the communications controller and one of each communications device in at least a subset of communications devices served by the neighboring communications controllers; and
    computing a correlation for each pair of communications devices in accordance with the measured channel.

2. The method of claim 1, wherein adjusting the manner of transmission comprises adjusting a transmit power level, a beam direction, or a combination thereof.

3. The method of claim 1, further comprising:
    receiving channel information from each communications device served by the communications controller; and
    adjusting the received channel information for each communications device.

4. The method of claim 3, wherein adjusting the received channel information comprises transforming the received channel information for the communications device by a measure of interference provided by the communications device.

5. The method of claim 1, wherein the at least a subset of communications devices served by the neighboring communications controllers comprises an entire set of communications devices served by the neighboring communications controllers.

6. The method of claim 5, wherein measuring the channel comprises measuring a direction of incidence.

7. The method of claim 5, wherein computing the correlation for each pair of communications devices comprises computing a value in accordance with an angle difference between each communication device in each pair of communications devices.

8. The method of claim 1, wherein selecting the communications device comprises selecting the communications device with a smallest correlation.

9. The method of claim 8, wherein selecting the communications device with a smallest correlation comprises selecting a communications device pair with the smallest correlation, wherein a communications device pair comprises a first communications device served by the communications controller and a second communications device from the at least the subset of communications devices.

10. The method of claim 1, wherein adjusting the manner of transmission comprises:
adjusting a transmit power level in response to determining that one of the correlations for the selected communications device to a communications device served by a neighboring communications controller exceeds a threshold; and
leaving the transmit power level unchanged in response to determining that the correlations for the selected communications device do not exceed the threshold.

11. The method of claim 10, wherein adjusting the transmit power level in response to determining that one of the correlations for the selected communications device to the communications device served by a neighboring communications controller exceeds a threshold comprises scaling a default transmit power level by a scaling factor proportional to an angle difference between the selected communications device and the communications device served by the neighboring communications controller.

12. A network component configured for selective data redundancy elimination, comprising:
a processor; and
a computer readable storage medium storing programming for execution by the processor, the programming including instructions to:
determine correlations between communications devices served by a communications controller and communications devices served by neighboring communications controllers;
select a communications device from the communications devices served by the communications controller in accordance with the correlations;
adjust a manner of transmission of a transmission containing information to the selected communications device in accordance with at least one of the correlations for the selected communications device; and
transmit the transmission to the selected communications device,
wherein the instructions to determine correlations comprise instructions to measure a channel between communications devices in each pair of communications devices consisting of one of each communications device served by the communications controller and one of each communications device in at least a subset of communications devices served by the neighboring communications controllers and compute a correlation for each pair of communications devices in accordance with the measured channel.

13. The network component of claim 12, wherein the instructions to adjust the manner of transmission comprise instructions to adjust a transmit power level, a beam direction, or a combination thereof.

14. The network component of claim 12, wherein the programming further comprises instructions to:
receive channel information from each communications device served by the communications controller; and
adjust the received channel information for each communications device.

15. The network component of claim 14, wherein the instructions to adjust the received channel information comprise instructions to transform the received channel information for a communications device by a measure of interference provided by the communications device.

16. The network component of claim 12, wherein the instructions to measure a channel comprise instructions to measure a direction of incidence.

17. The network component of claim 12, wherein the instructions to determine correlations comprise instructions to compute a value in accordance with an angle difference between each communication device in each pair of communications devices.

18. The network component of claim 12, wherein the at least a subset of communications devices served by the neighboring communications controllers comprises an entire set of communications devices served by the neighboring communications controllers.

19. The network component of claim 12, wherein the instructions to select a communications device comprise instructions to select the communications device with a smallest correlation.

20. The network component of claim 19, wherein the instructions to select the communications device with a smallest correlation comprise instructions to select a communications device pair with the smallest correlation, wherein a communications device pair comprises a first communications device served by the communications controller and a second communications device from the at least the subset of communications devices.

21. The network component of claim 12, wherein the instructions to adjust a transmit power level of a transmission comprises instructions to:
adjust the transmit power level in response to determining that one of the correlations for the selected communications device to a communications device served by the neighboring communications controller exceeds a threshold; and
leave the transmit power level unchanged in response to determining that the correlation for the selected communications device does not exceed the threshold.

* * * * *